Figure 1:
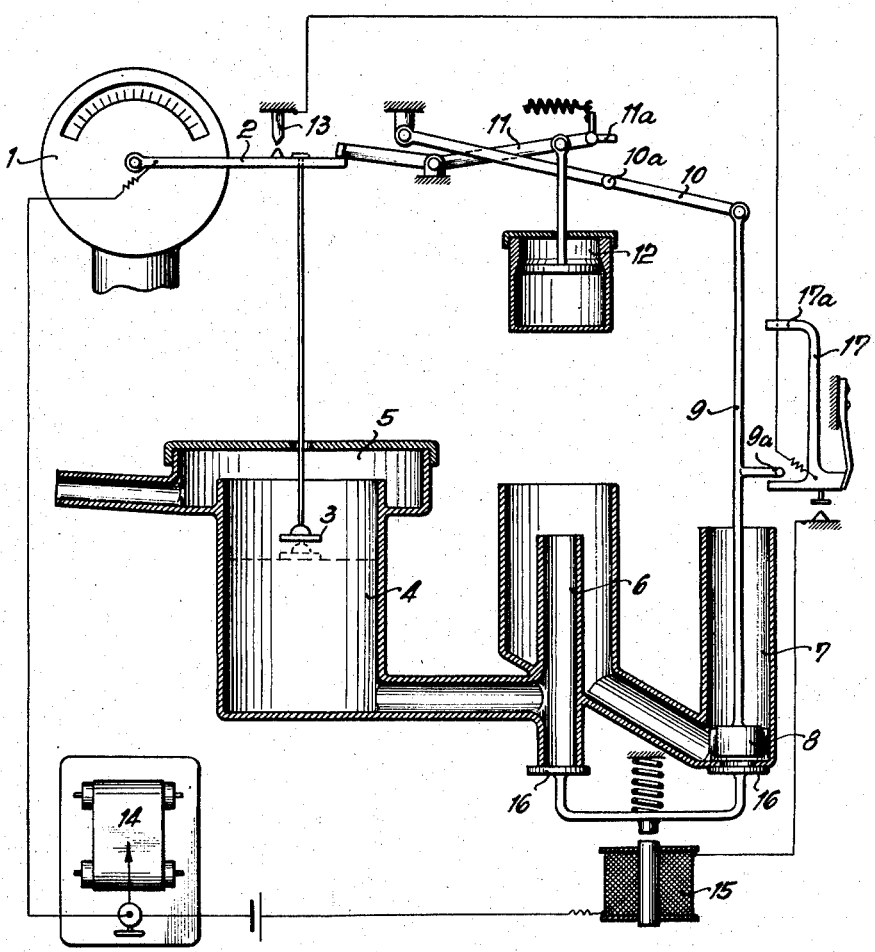

INVENTORS:
OTTO HETTCHE AND
KARL SCHULTZE
BY:

July 21, 1959 — O. HETTCHE ET AL — 2,895,329
PROCESS AND AN APPARATUS FOR MEASURING IMPURITIES OF WATER
Filed June 15, 1954 — 3 Sheets-Sheet 3

INVENTORS
OTTO HETTCHE
CARL SCHULTZE
BY Michael S. Striker
Attorney

2,895,329
PROCESS AND AN APPARATUS FOR MEASURING IMPURITIES OF WATER

Otto Hettche, Hamburg, and Karl Schultze, Hamburg-Blankenese, Germany, assignors to Bran & Lubbe, Hamburg, Germany, a corporation of Germany Application June 15, 1954, Serial No. 436,936
Claims priority, application Germany June 15, 1953
14 Claims. (Cl. 73—53)

Our invention relates to a process and an apparatus for measuring quantities of impurities in water, especially such water which is intended for the preparation of drinking water. Our invention mainly concerns the measuring of quantities of surface-active substances in water.

The presence of surface-active substances is always an essential indication of the presence of impurities. Such surface-active substances are not to be found in fountain-water. They appear only where the water has previously been used for household or industrial purposes. For this reason there are always numerous other impurities to be found in connection with these surface-active substances, which is due to the fact that the water has been used for rinsing or cleaning purposes. For determining the qualities of the water it is therefore of the utmost importance to measure the quantity of surface-active substances present in the water.

It is therefore one object of our invention to measure in a quick and reliable manner even very small quantities of surface-active substances. Another object of our invention is that the measuring shall be done automatically and in a self-recording manner. A further object is to achieve permanent, continuous control of the flowing water and to measure continuously the surface-active substances present in such flowing water.

An auxiliary object of our invention is, furthermore, to increase the quantity of surface-active substances at the surface of the water, so that they can also be measured with a high degree of safety, even if present in very small quantities only. A special object of our invention is the construction of an apparatus for the automatic supervision and registration of the amount of surface-active substances present in flowing water, over a long period of time. In this connection our invention concerns also the self-regulating control of the concentration of surface-active substances present in the water by connecting the measuring apparatus with an alarm instrument, which is released as soon as the concentration of surface-active substances exceeds a certain allowable limit. In detail, our invention relates to the construction of such an apparatus which, after the termination of one measurement, automatically repeats the measurement with new quantities of water, automatically records the measured values and continues the measuring and recording until turned off.

Further objects and purposes of our invention will be seen from the following detailed specification:

Our new procedure is based on the surprising observation that surface-active substances, once having been collected on the surface of the water will remain there relatively firmly absorbed and will not penetrate again into the interior of the body of water. This fact is apparently due to partial insolubility of the surface-active substances in water. If the water to be investigated is given an especially large surface by spreading the same and at the same time a very small depth, a relatively high portion of the surface-active substances will collect at the surface owing to the fact that the medium length of the path which the dissolved molecules of surface active substances being in permanent motion have to travel from the interior of the liquid to the surface, is very much reduced. If the water surface is now being diminished in size, the surface-active substances are quickly and unexpectedly well concentrated on the surface of the water. This result is very much surprising and was not to be foreseen by the expert.

It is a characteristic quality of these substances that they reduce the surface tension of the water, so that by measuring the surface tension of such water, in which the already mentioned substances have been enriched in the described manner, the presence of a few milligrams of these substances in 1 cubic-meter can still be determined.

Figure 2:
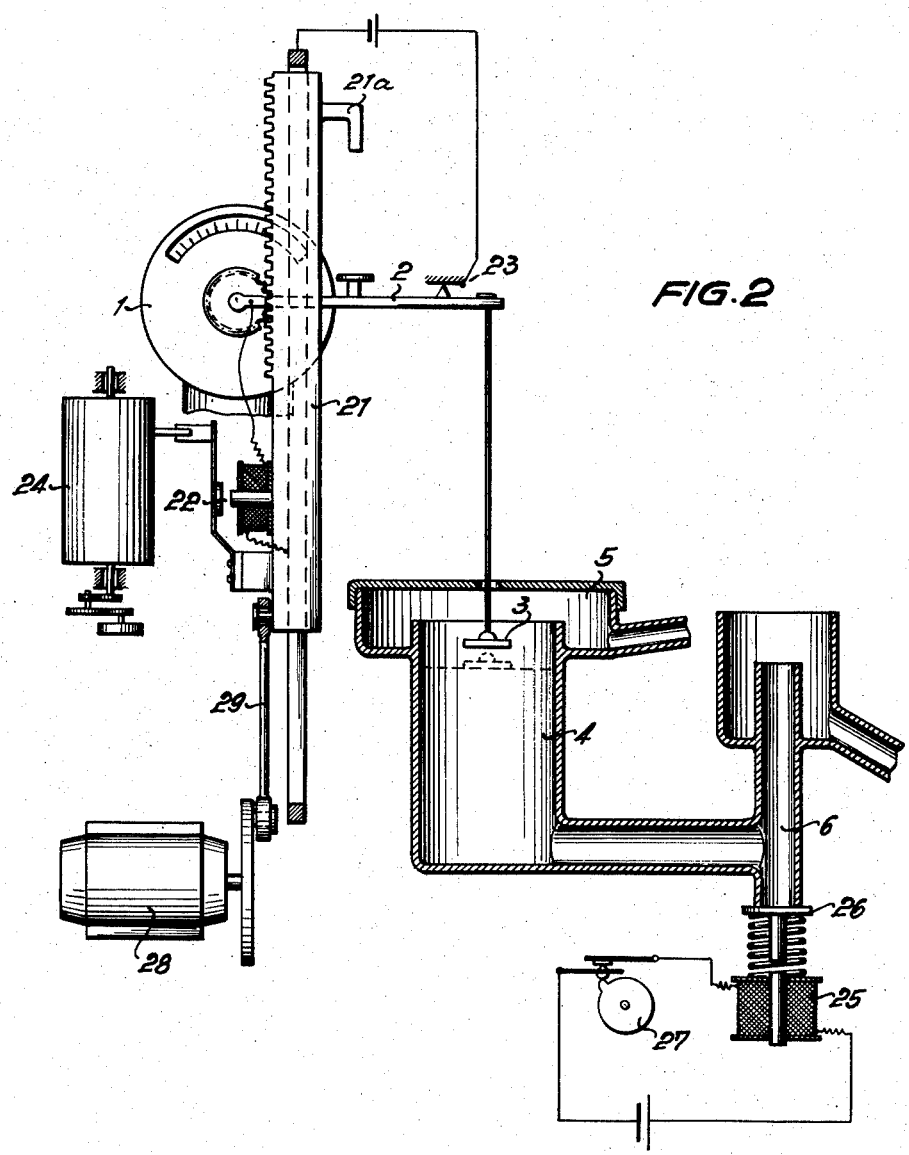
Figure 3:
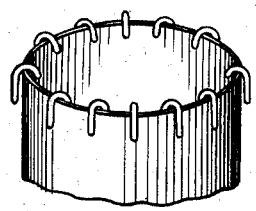
Figure 4:
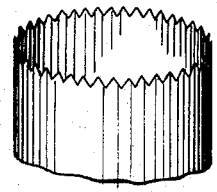
Figure 5:
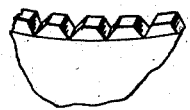

An automatic measuring and recording apparatus serves for the realization of this procedure, of which without however restricting our invention to the details shown by way of example two embodiments are being shown in the enclosed drawings, in which:

Fig. 1 shows an apparatus by means of which the time can be measured in which is required to reach a predetermined degree of reduction of the surface tension of a liquid;

Fig. 2 shows an apparatus which records a series of measurements at invariable intervals. By drawing up the various reduction values received by measuring at equal intervals, a continuous curve of the fluctuations of the surface tension and, thereby, of the concentration of surface-active substances in the liquid to be investigated can be obtained; and Figs. 3–5 illustrate various embodiments of capillary transfer means such as are employed according to the present invention for transferring liquid from a first to a second receptacle.

Referring now to the drawings, our new apparatus consists of a round or cornered vessel 4, which at its upper rim is wholly or partially surrounded by a flat trough or channel 5 into which the supplying pipe for the water to be investigated discharges. The diameter of the vessel 4 and of trough 5 will vary according to the qualities of the water to be investigated, i.e. for water poor in surface-active substances, for example drinking or river water a different diameter will be chosen than for water rich in these substances as for example drain water. For water poor in surface-active substances the vessel will be given a diameter of 40 to 50 mm., while the trough 5 will have a diameter twice as great or even greater. Instead of the simple trough 5 also a cascade-like arrangement of several troughs or channels can be made. For a water rich in impurities the difference between the diameter of trough 5 and that of vessel 4 can be kept smaller, especially the vessel 4 can in this case have a greater diameter. At the outside of the upper rim of the vessel 4, where this latter laps over the trough or channel 5, there are several conduits working by capillarity, as shown in Figs. 3–5, which direct the water flowing into the trough 5 towards the vessel 4. These capillary conduits can consist, as shown in Fig. 3, of small sticks of glass in the form of hooks, which are hanging in a big number over the outer rim of the vessel. The conduits can also only consist of notchings or channels of for example rastrum-like arrangements around the outer wall of the vessel 4 as shown in Figs. 4 and 5. Since it cannot be avoided in practice that traces of dust or other physical impurities fall upon the water surface, it is advisable to arrange these capillary conduits at such distances that surface whirls can form themselves between one and the other, in which latter the flowing particles will catch, so that they cannot move on towards the middle of the water surface.

For this reason it is important, that the water enters into the measuring vessel by overflowing in a cascade-like conduit of at least one, preferably several steps.

The vessel 4 is connected with an overflow pipe 6, which insures that the water surface in the vessel 4 is permanently maintained at the same height.

The channel or trough 5 is protected against dust or other impurities by a lid with a hole in the middle. Through this hole in the middle of the lid, a hair, a silk thread or the like is introduced which bears at its lower end an adhesion element 3, while the upper end of the thread is fastened to the beam 2 of a torsion balance 1. The adhesion element can, for example, consist of an open ring of thin, flattened wire of platinum, which has a diameter of about 4 mm.

The receiving vessel of the overflow pipe 6 is connected to an ascension pipe 7. The overflow pipe 6 as well as the ascension pipe 7 are fitted with bottom valves 16, which are kept in their position by springs and which can be opened by a common magnet 15. In the ascension pipe 7 there is a floating element 8 which is fastened to the bar 9. The bar 9 has a stop 9a which works in cooperation with a contact 17, the working method of which will be described later on. The bar 9 is connected to a one-armed lever 10 by a joint, the lever 10 having a catch cog 10a. Over the catch cog 10a there is the stop 11a of a double-armed lever 11. This stop 11a is of such construction, that being pressed from below it stiffly moves the lever 11, while being pressed from above the stop 11a being fixed to the lever 11 by a joint can be moved without taking the lever 11 along. That arm of the double-armed lever 11, which is provided with the stop 11a, is connected to a liquid or air damper 12 in order to avoid a sudden motion of the lever 11. With its other arm the lever 11 presses down the beam 2 of the torsion balance 1.

An electric contact 13 is arranged over the beam 2 which electrically contacts the beam 2 when the same moves upwards. The contact 13 via the above mentioned contact 17 is connected to the magnet 15, which is operating the bottom valves 16 of the overflow pipe 6 and the ascension pipe 7. On the other hand the magnet 15 via an electric battery is working in connection with the magnet of a recorder or writing means 14, this recorder 14 again being electrically connected to the beam 2 of the torsion balance, the circuit thus being completed.

By means of this new apparatus it is now possible to carry out automatically and continuously measurements of surface-active substances present in water and also to automatically record the results of the measurements. The working method of this new apparatus is the following:

After vessel 4 has been filled with water to the level, which is given by height of the overflow pipe 6, the water to be investigated is let into trough 5 in which it will spread out. The surface-active substances present in this water will now collect on the surface of the liquid and, will reach via the capillary conduits around the outer rim of the vessel 4, the surface of the water in this vessel. As long as the water to be investigated continues to flow into trough 5, the surface-active substances will continuously be enriched on the water surface. At the same time the water begins to flow over the upper rim of the overflow pipe 6 and thus reaches the ascension pipe 7 and lifts the floating element 8. This latter element moves bar 9 with lever 10 connected thereto, upwardly, at the same time by means of stop 9a shutting the electric circuit over contact 17, and the catch cog 10a pressing on the stop 11a. This results in causing one end of the double-armed lever 11 pressing down beam 2 of the torsion balance so that the adhesion element 3 will move downwardly and settle on the water surface in vessel 4. The torsion balance 1 has a pre-adjusted pre-tension, which corresponds to a certain value of the surface tension. If floating element 8 continues in its upward movement, catch cog 10a will pass stop 11a and thereby releases lever 11. In order to avoid a lifting of the adhesion element off the water surface by a sudden release and upward movement of beam 2 of the torsion balance, damper 12 has been arranged on the opposite end of lever 11, so that beam 2 is released gradually by slow downward movement of lever 11 whereby the adhesion element will not be lifted off the water surface.

As soon as, due to the accumulation of surface-active substances on the water surface in vessel 4, the surface tension has dropped to that value which has previously been adjusted on torsion balance 1, adhesion element 3 will be lifted off the water surface and beam 2 will move upwardly thereby closing the electric circuit via contact 13. With the electric circuit now closed, the magnet of the writing and recording instrument 14 comes into operation leaving a corresponding mark on a continuously passing paper ribbon. Simultaneously the magnet, induced by the closing of the electric circuit, opens valves 16, so that the water will flow out of vessel 4, overflow pipe 6 and ascension pipe 7. This results in the falling down of floating element 8 thereby moving bar 9 downwardly. The stop 9a of bar 9 will now touch contact 17 and thereby the electric circuit will be switched off. The writing means 14 is thereby lifted off the paper ribbon, and the magnet 15 also remains without current, so that the valves 16 will be shut by means of the springs. Due to the continuing flow of water, containers 4, 6 and 7 will be filled up again, floating element 8 will move upwardly again, beam 2 will be pressed down in the manner described above, adhesion element 3 will settle on the water surface to be investigated, and the entire process is thus repeated.

By this apparatus and the working method described above, it is possible to measure in this measuring apparatus the time in which a certain quantity of surface-active substances accumulates on the surface of the water to be investigated. Simultaneously this time is automatically recorded on the paper ribbon. If the water is rich in impurities, the paper ribbon will show that the adhesion element has been lifted very frequently from the water surface, while, if the water is relatively clean, the intervals at which there will be a mark on the paper ribbon, will be very much wider.

The apparatus shown by way of example in Fig. 2, serves for measuring the occurring absolute values of the surface-tension. The apparatus consists, as well as that shown in Fig. 1, of measuring vessel 4 surrounded at its upper rim by a flat trough 5 into which the supply pipe for the liquid discharges. In order to adjust and maintain a certain level of the liquid in measuring vessel 4 there is arranged, as shown in Fig. 1, an overflow pipe 6 which empties by overflowing into a receiving vessel serving for the removal of the flowing water. The overflow pipe 6 is closed by bottom valve 26 which can be opened by means of electromagnet 25. Electromagnet 25 is induced at regular intervals by means of automatic switch 27 so that the measuring vessel 4 is emptied at regular intervals. Adhesion element 3 is fastened to beam 2 of torsion balance 1 similarly as in Fig. 1. The torsion balance 1 is fitted at its axis of rotation with pinion 1a which is in touch with toothed bar 21, the latter being slowly moved upwards by means of an eccentric 29 driven by any sort of drive, be it an electromotor or a spring drive, thereby gradually applying torsional force to the torsion balance 1.

Instead of pinion 1a and toothed bar 21 for applying torsional force to the torsion balance, other power transmission means can be chosen as for instance a pulley rotated by a belt or, a helical ear, or it might be driven by hand. The essential point, however, is that the balance is put in tension slowly and steadily so that the tension can be exactly measured at any time.

The toothed bar 21 is furthermore fitted with an elastic arm 22 with a writing means arranged opposite writing drum 24. The elastic arm 22 fitted with a permanent magnet can be repelled by an electromagnet fastened to toothed bar 21 so that the writing means touches writing drum 24. Toothed bar 21 when moving slowly downwards will press with its stop 21a on beam 2 of the torsion balance. Moving upwards, beam 2 of the torsion balances touches an electric contact 23, thereby closing the electric circuit and inducing the electromagnet opposite elastic arm 22.

The following is the working method of the apparatus:

After measuring vessel 4 and overflow pipe 6 have been filled with liquid up to the desired level, a slight pressure is put on beam 2 of the torsion balance by stop 21a of toothed bar 21 moving downwardly, so that the adhesion element will settle on the water surface. The toothed bar 21 now moving slowly upwardly will gradually apply tensional force to the torsion balance, until adhesion element 3 will be lifted off the water surface. At this moment beam 2 touches contact 23, the electromagnet is induced and pushes elastic arm 22 with the writing means towards writing drum 24, leaving marks of different height on the writing drum. The height of the marks on the writing drum depends on the position of the toothed bar 21 at that moment at which the adhesion element is lifted off the water surface and this position again depends on the tension of the torsion balance at the same moment, so that the height of the marks on the writing drum is in direct proportion to the surface-tension at that moment.

At the same moment automatic switch 27 induces magnet 25 and thereby opens bottom valve 26, so that measuring vessel 4 will be emptied. In any event, automatic switch 27 must be working in cooperation with drive 28 of toothed bar 21. Thereafter the process is repeated.

Naturally, instead of two independent electric circuits, as shown on the drawings, one single electric circuit can be applied. In this case, by closing contact 23, the electromagnet opposite the writing means as well as the electromagnet 25, come into operation. When stop 21a of the toothed bar 21 presses beam 2 down and interrupts contact 23, the electric circuit is switched off.

As may be seen from the above description, the absolute values of the surface tension of a liquid to be investigated may be determined with the apparatus according to the invention. In this case the measuring vessel is filled up to the level given by the height of overflow pipe 6 and the flowing in of the liquid is stopped until the measuring is finished. But it is also possible to measure the surface-tension of flowing water by repeating the measuring at equal intervals and graphically recording successive values of measured surface tension thereby receiving a continuous curve of these measuring values. Apart from this, the time may be measured which is necessary to accumulate a certain quantity of surface-active substances in the measuring apparatus.

Of course, it is also possible to couple the apparatus with an alarm means or a telecommunication-arrangement. If, e.g. the measured value of the surface-tension has dropped below a certain allowable height—which is an indication for an unallowable increase in the concentration of impurities in the water to be investigated—an optical or acoustical signalling device can be actuated, signalling the unallowable height of the impurities in the water. At the same time the flowing-in of dirty water can be stopped automatically or the purification thereof can be intensified or what else may be necessary can be done.

Obviously, numerous modifications of the apparatuses described above are possible without leaving the scope of the invention. Instead of the torsion balance for instance any other balance, be it one of the usual beam scales, be it any other measuring apparatus, which allows the measuring of a power, can be applied. Naturally the apparatus is not only useful for measuring the surface tension of water but can also be applied for measuring the surface tension of any other liquid. For the apparatus according to Figure 1 it is not necessary to have a special overflow pipe 6 apart from ascension pipe 7, rather the ascension pipe 7 may serve at the same time for maintaining the level in measuring vessel 4. In any case our invention shall not depend on the details but only be limited by the following claims.

We claim:

1. In an apparatus for automatically measuring and recording the concentration of surface-active substances in liquids, in combination, a measuring vessel with a trough or channel at its upper rim, this latter being arranged round the measuring vessel in the form of a cascade and having such a configuration that the liquid upon entering said measuring vessel will have a smaller surface area than it had when it was in said trough so that the concentration of surface-active substances will be greater in said measuring vessel than it was in said trough, an overflow pipe in communication with said measuring vessel for automatically adjusting and maintaining a certain water level therein; an adhesion element; a balance; means for suspending said adhesion element from said balance so as to place said adhesion element in contact with said liquid surface in said measuring vessel; and means operatively connected with said balance for measuring the force necessary to lift said adhesion element from the surface of said liquid thereby indicating the concentration of said surface active substances therein.

2. The combination according to claim 1, and capillary means arranged along the upper rim of the measuring vessel over which the liquid to be investigated flows from the trough into the measuring vessel for facilitating the flow of surface-active substances into said measuring vessel.

3. The combination according to claim 1, including a floating element arranged in said overflow pipe, and a lever transmission connected to said float element and to said adhesion element for placing the latter on the liquid surface when said measuring vessel is filled to a predetermined level with the liquid to be investigated.

4. The combination according to claim 1, and electric switch means connected to said adhesion element for energizing an electric circuit and dumping the liquid in said measuring vessel when said adhesion element lifts off the liquid surface.

5. The combination according to claim 3, and means connected to said floating element for actuating an electric circuit and sealing the measuring vessel upon downward movement of the floating element.

6. The combination according to claim 1 wherein said balance is a turnably mounted torsion balance, and including a toothed bar for gradually applying a torsional force to the torsion balance, a pinion fastened to the axis of the torsion balance, said pinion meshing with said toothed bar, and means for uniformly and relatively slowly shifting said toothed bar in order to put tension on the balance.

7. The combination according to claim 6, including a driving means, and an eccentric connecting the toothed bar with said driving means for reciprocating the toothed bar at regular intervals.

8. An apparatus for measuring the surface tension of a liquid, comprising in combination first receptacle means for imparting to a liquid a first configuration in which the liquid has a first surface area; second receptacle means for imparting to a liquid a second configuration in which the liquid has a second surface area smaller than said first surface area; transfer means in communication with said first and second receptacle means for transferring a liquid in said first receptacle means to said second receptacle means in a manner that during transfer surface-active substances accumulated on the surface area of the liquid while the same was in said first receptacle remain at the surface of the liquid and are consequently concentrated on the surface area of the liquid while the same is in said second receptacle means, said transfer means including capillary means in communication at least with said first receptacle means and adapted to be contacted by the surface of the liquid contained therein for conveying the surface-active substances accumulated thereat out of said first receptacle means; and means for measuring the surface tension of the liquid in said second receptacle means and thereby determining the concentration of surface-active substances at the surface of the liquid while the same is in said second receptacle means.

9. An apparatus for measuring the surface tension of a liquid, comprising, in combination, first receptacle means for imparting to a liquid a first configuration in which the liquid has a first surface area; second receptacle means for imparting to a liquid a second configuration in which the liquid has a second surface area smaller than said first surface area, said first and second receptacle means having a common wall portion so that when the liquid level in said first receptacle means attains a level substantially flush with the upper part of said common wall portion the liquid in said first receptacle means may cascade into said second receptacle means; transfer means in communication with said first and second receptacle means for transferring a liquid in said first receptacle means to said second receptacle means in a manner that during transfer surface-active substances accumulated on the surface area of the liquid while the same was in said first receptacle remain at the surface of the liquid and are consequently concentrated on the surface area of the liquid while the same is in said second receptacle means, said transfer means including capillary means on said upper part of said common wall portion and adapted to be contacted by the surface of the liquid in said first receptacle means when the same cascades over said upper part of said common wall portion into said second receptacle means for conveying the surface-active substances accumulated at the surface of the liquid in said first receptacle means from said first receptacle means to the surface of the liquid in said second receptacle means; and means for measuring the surface tension of the liquid in said second receptacle means and thereby determining the concentration of surface-active substances at the surface of the liquid while the same is in said second receptacle means.

10. The combination defined in claim 9, said capillary means including a plurality of substantially U-shaped capillary members, each being arranged along said upper part of said common wall portion so that opposite legs of each of said members are within said first and second receptacle means, respectively.

11. The combination defined in claim 9, said upper part of said common wall portion being serrated so as to constitute said capillary means.

12. An apparatus for measuring the surface tension of a liquid, comprising in combination, first receptacle means for imparting to a liquid a first configuration in which the liquid has a first surface area; second receptacle means for imparting to a liquid a second configuration in which the liquid has a second surface area smaller than said first surface area, said first and second receptacle means having an endless common wall portion so that when the liquid level in said first receptacle means attains a level substantially flush with the upper part of said common wall portion, the liquid in said first receptacle means may cascade into said second receptacle means; transfer means in communication with said first and second receptacle means for transferring a liquid in said first receptacle means to said second receptacle means in a manner that during transfer surface-active substances accumulated on the surface area of the liquid while the same was in said first receptacle remain at the surface of the liquid and are consequently concentrated on the surface area of the liquid while the same is in said second receptacle means, said transfer means including capillary means on said upper part of said common wall portion and adapted to be contacted by the surface of the liquid in said first receptacle means when the same cascades over said upper part of said common wall portion into said second receptacle means for conveying the surface-active substances accumulated at the surface of the liquid in said first receptacle means from said first receptacle means to the surface of the liquid in said second receptacle means; and means for measuring the surface tension of the liquid in said second receptacle means and thereby determining the concentration of surface-active substances at the surface of the liquid while the same is in said second receptacle means.

13. In a method for measuring the concentration of surface-active substances in a flowing liquid, the steps of imparting to the flowing liquid a first configuration in which the liquid has a small depth and a first surface area and permitting the liquid to retain said first configuration sufficiently long to allow surface-active substances contained therein to accumulate on said first surface area; thereafter imparting to the liquid a second configuration in which the liquid has a second surface area smaller than said first surface area the liquid flow from said first configuration to second said configuration being in the form of a thin layer so that it maintains at the surface of the liquid during the imparting thereto of said second configuration the surface-active substances accumulated on said first surface area, thereby concentrating on said second surface area the surface-active substances accumulated on said first surface area of the liquid while the same was in said first configuration thereof and determining the surface tension of said liquid within said second surface area, said thus determined surface tension being a measure of the concentration of surface-active substances in said liquid within said second surface area.

14. In a method for continuously measuring the concentration of surface-active substances in a flowing liquid, the steps of imparting to the flowing liquid a first configuration in which the liquid has a small depth and a first surface area and permitting the liquid to retain said first configuration sufficiently long to allow surface-active substances contained therein to accumulate on said first surface area; thereafter imparting to the liquid a second configuration in which the liquid has a greater depth and a second surface area smaller than said first surface area the liquid flow from said first configuration to said second configuration being in the form of a thin layer so that it maintains at the surface of the liquid during the imparting thereto of said second configuration the surface-active substances accumulated on said first surface area, thereby concentrating on said second surface area the surface-active substances accumulated on said first surface area of the liquid while the same was in said first configuration thereof and determining the surface tension of said liquid within said second surface area, said thus determined surface tension being a measure of the concentration of surface-active substances in said liquid within said second surface area.

References Cited in the file of this patent

UNITED STATES PATENTS

| 1,513,882 | Bateman | Nov. 4, 1924 |
| 1,831,170 | Gratama | Nov. 10, 1931 |
| 1,960,224 | Schoenberg | May 22, 1934 |
| 2,166,904 | Gray | July 18, 1939 |
| 2,328,027 | Muller | Aug. 31, 1943 |
| 2,635,463 | Pouradier et al. | Apr. 21, 1953 |

FOREIGN PATENTS

| 902,663 | France | Dec. 22, 1944 |

OTHER REFERENCES

Cenco News Chats, No. 74, Winter 1951–1952, pp. 4–6, published by Central Scientific Co., Chicago.